F. M. DAUNOY.
Car-Track Clearer.
No. 64,639.
Patented May 14, 1867.
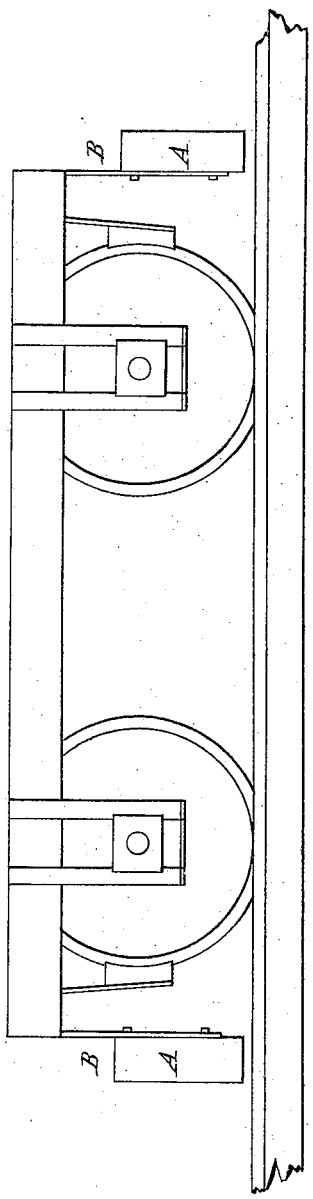
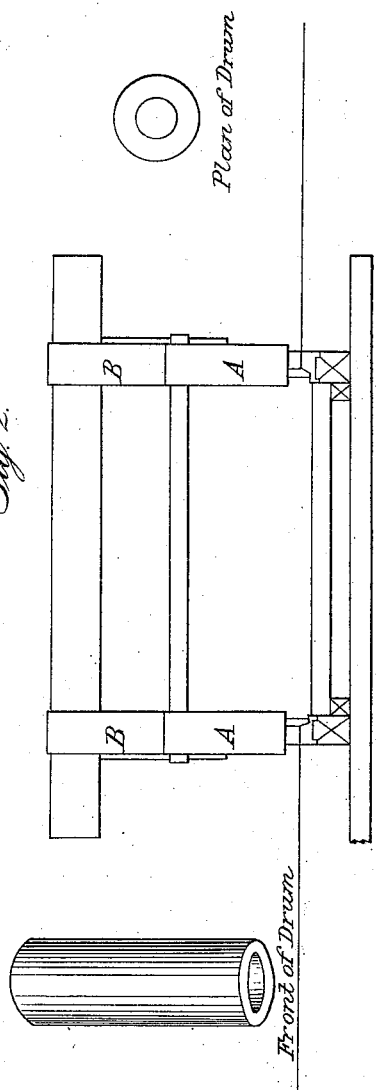
Witnesses:
Jules A. Dejean
Paul L. Laroche
Inventor:
Felix Manuel Daunoy

United States Patent Office.

FELIX MANUEL DAUNOY, OF NEW ORLEANS, LOUISIANA.

Letters Patent No. 64,639, dated May 14, 1867.

---

IMPROVED GUARD FOR RAILWAY CARS.

---

The Schedule referred to in these Letters Patent and making part of the same.

---

TO ALL WHOM IT MAY CONCERN:

Be it known that I, FELIX MANUEL DAUNOY, of the city of New Orleans, parish of Orleans, State of Louisiana, have invented a new and useful improvement to prevent persons from being crushed by falling in front of the wheels of horse or steam cars; and I do hereby declare that the following is a full and correct description thereof, reference being had to the accompanying drawings, and to the letters marked thereon, forming a part of this specification.

The same letters are used to indicate the same parts in the different figures.

The letter A, in Figure 1, represents the side view of the drum in its natural position.

The letter B, in fig. 1, represents the side view of the plate of iron on which the drum is screwed.

The letter A, in Figure 2, represents the side view of the drum.

The letter B, in fig. 2, represents the front view of the plate on which the drum is screwed.

Description.

The nature of my invention consists in suspending perpendicularly, in front of every wheel of a horse or steam car, a gum rubber drum, fixed to a plate of iron. This plate is firmly screwed on the front top of the truck, and falls in front of the wheels without touching the brake, so that a person who falls on the rail will be protected by the drum intervening between his body and the wheel. The drums are screwed on the plate with four screws—two on the upper part, two on the lower part. The screws, being inside of the drum, have flat heads, and are fixed on the outside of the plate next to the wheel.

Proportions.

First. The plate of iron to which the drum is suspended must be three inches wide, one and one-half inch thick. As the trucks of different cars are of different heights, the length of said plate varies in proportion.

Second. The drum is twelve inches long, seven inches wide, and from one to one and one-fourth inch thick.

Third. There must be a space of an inch between the bottom of the drum and the surface of the rail, and of three inches between the lower end of the plate and the surface of the rail, in order to avoid friction.

Claim.

What I claim as my invention, and which I desire to secure by Letters Patent, is—

The application of a gum rubber drum in front of every wheel of a horse or steam car, as herein described.

FELIX MEL. DAUNOY.

Witnesses:
  JULES A. DÉPAU,
  JOS. N. ROBERT.